(12) United States Patent
Baek et al.

(10) Patent No.: US 10,924,213 B2
(45) Date of Patent: Feb. 16, 2021

(54) DEVICE AND METHOD FOR RECEIVING BROADCAST SIGNAL

(71) Applicant: LG ELECTRONICS INC., Seoul (KR)

(72) Inventors: Jongseob Baek, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/774,766

(22) Filed: Jan. 28, 2020

(65) Prior Publication Data

US 2020/0169353 A1 May 28, 2020

Related U.S. Application Data

(63) Continuation of application No. 16/301,913, filed as application No. PCT/KR2016/005467 on May 24, 2016.

(51) Int. Cl.
*H04L 1/00* (2006.01)
*H04L 5/00* (2006.01)

(52) U.S. Cl.
CPC .......... *H04L 1/0061* (2013.01); *H04L 1/0003* (2013.01); *H04L 1/0071* (2013.01); *H04L 5/0007* (2013.01)

(58) Field of Classification Search
None
See application file for complete search history.

(56) References Cited

U.S. PATENT DOCUMENTS

| 8,799,739 | B2 | 8/2014 | Yokokawa et al. |
| 9,065,598 | B2 | 6/2015 | Ouchi et al. |
| 9,106,265 | B2 | 8/2015 | Nicolas et al. |
| 9,325,448 | B2 | 4/2016 | Loghin et al. |
| 9,564,992 | B2 | 2/2017 | Baek et al. |
| 9,602,245 | B2 | 3/2017 | Jeong et al. |
| 9,608,781 | B2 | 3/2017 | Baek et al. |
| 9,614,595 | B2* | 4/2017 | Baek ................... H04L 27/2626 |
| 9,667,380 | B2 | 5/2017 | Baek et al. |
| 9,692,491 | B2 | 6/2017 | Baek et al. |
| 9,800,269 | B2 | 10/2017 | Kim et al. |
| 9,935,890 | B2 | 4/2018 | Klenner |
| 9,966,974 | B2 | 5/2018 | Hwang et al. |

(Continued)

FOREIGN PATENT DOCUMENTS

| KR | 10-2015-0145738 A | 12/2015 |
| WO | WO 2015/190695 A1 | 12/2015 |
| WO | WO 2016/060355 A1 | 4/2018 |

*Primary Examiner* — Kouroush Mohebbi
(74) *Attorney, Agent, or Firm* — Birch, Stewart, Kolasch & Birch, LLP

(57) ABSTRACT

A method and device for receiving a broadcast signal are discussed. The method includes in one example receiving a broadcast signal; orthogonal frequency division multiplexing (OFDM) demodulating the broadcast signal; parsing a signal frame of the broadcast signal; time deinterleaving one or more Time Interleaving (TI) block of the signal frame based on an interleaving sequence order, wherein data cells in the one or more TI block are written into a memory based on position information of virtual cells skipped in time interleaving reading operation at a transmitter; and forward error correction (FEC) decoding the broadcast data.

8 Claims, 12 Drawing Sheets

(56) References Cited

U.S. PATENT DOCUMENTS

| | | | |
|---|---|---|---|
| 9,979,579 B2 | 5/2018 | Baek et al. | |
| 10,050,743 B2 | 8/2018 | Baek et al. | |
| 10,110,408 B2 | 10/2018 | Baek et al. | |
| 10,194,185 B2 | 1/2019 | Ng | |
| 10,243,770 B2 | 3/2019 | Baek et al. | |
| 10,263,739 B2 | 4/2019 | Baek et al. | |
| 10,326,475 B2 | 6/2019 | Kim et al. | |
| 10,454,841 B2 | 10/2019 | Klenner | |
| 10,666,390 B2 * | 5/2020 | Baek | H04L 1/0003 |
| 2011/0158354 A1 | 6/2011 | Yokokawa et al. | |
| 2014/0310577 A1 | 10/2014 | Jeong et al. | |
| 2017/0310423 A1 * | 10/2017 | Lim | H03M 13/2732 |
| 2019/0372692 A1 | 12/2019 | Park et al. | |

* cited by examiner

[FIG. 1]
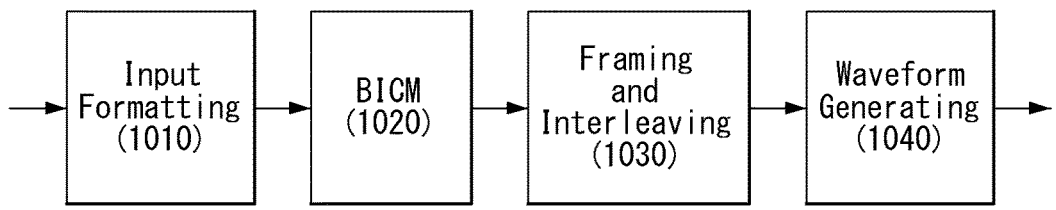
[FIG. 2]
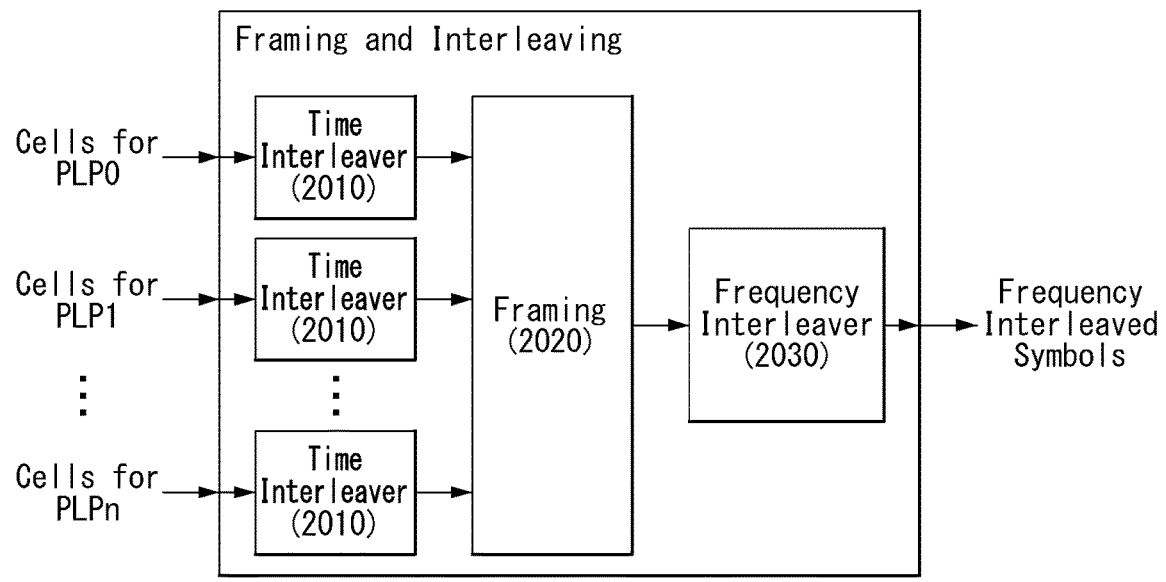

[FIG. 3]
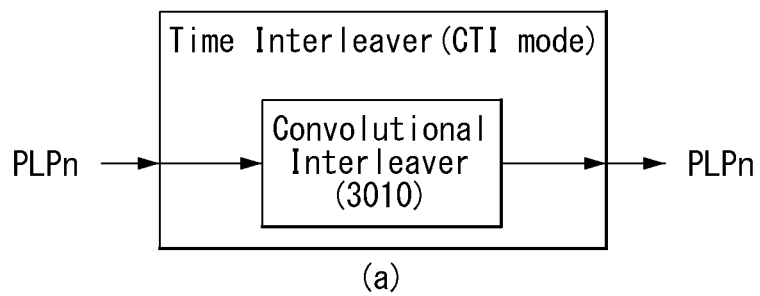
(a)
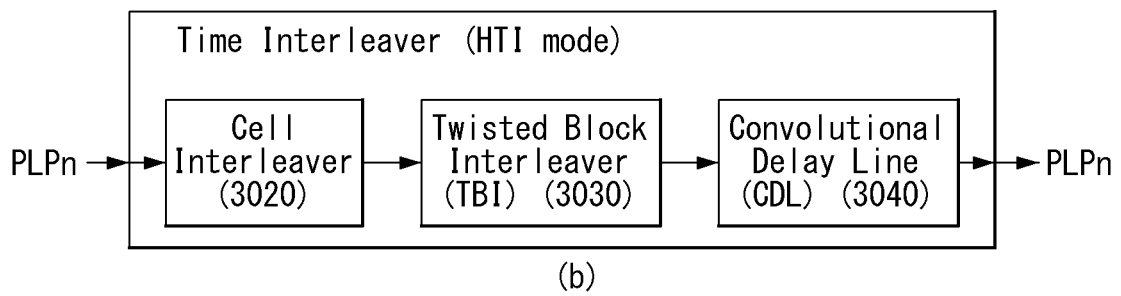
(b)

[FIG. 4]
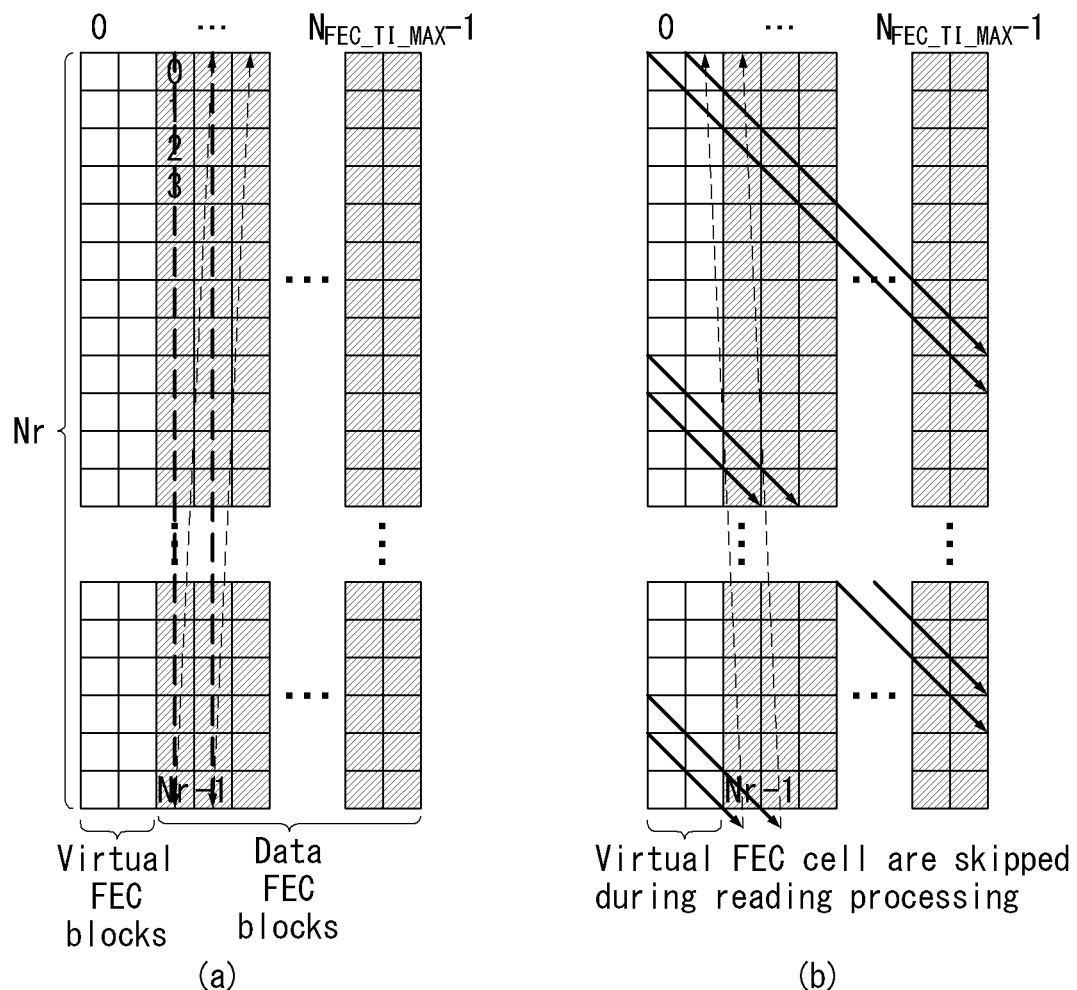

[FIG. 5]
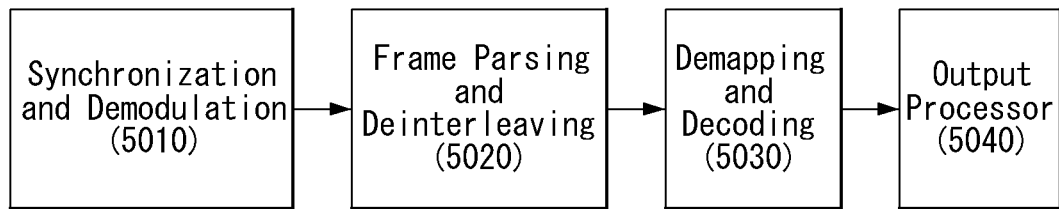
[FIG. 6]
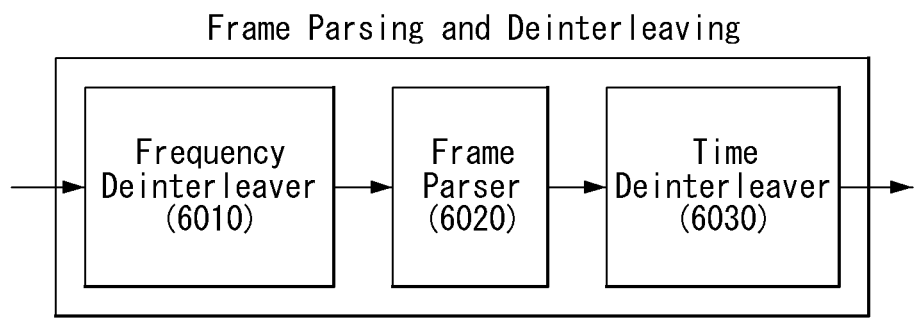
[FIG. 7]
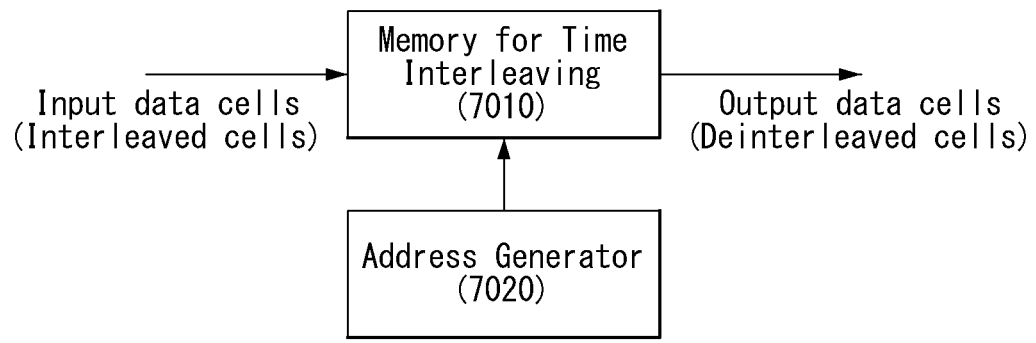

[FIG. 8]
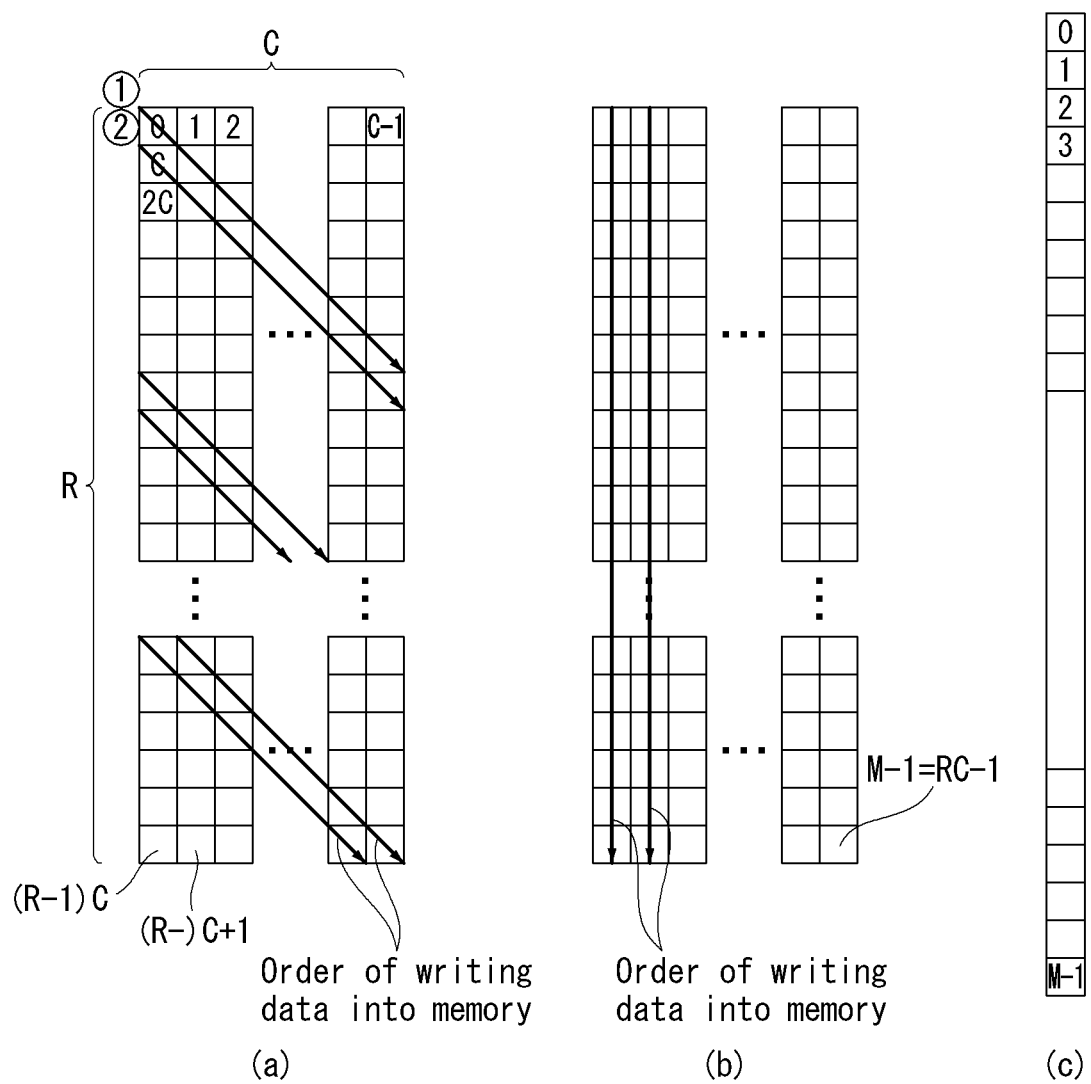

[FIG. 9]

| a0 | e0 | i0 |
|----|----|----|
| b0 | f0 | j0 |
| c0 | g0 | k0 |
| d0 | h0 | l0 |

(0-th TI block)

| a0 | f0 | k0 | d0 | e0 | j0 | c0 | h0 | i0 | b0 | g0 | l0 |

(output data cells after twisted block interleaving)

(a)

| a1 | e1 | i1 |
|----|----|----|
| b1 | f1 | j1 |
| c1 | g1 | k1 |
| d1 | h1 | l1 |

(1-th TI block)

| a1 | f1 | k1 | d1 | e1 | j1 | c1 | h1 | i1 | b1 | g1 | l1 |

(output data cells after twisted block interleaving)

Memory address     0 1 2 3 4 5 6 7 8 9 10 11

Memory data cells for the 0-th TI block: | a0 | f0 | k0 | d0 | e0 | j0 | c0 | h0 | i0 | b0 | g0 | l0 |

(a)

Address generation for deinterleaving the 0-th TI block: | 0 | 9 | 6 | 3 | 4 | 1 | 10 | 7 | 8 | 5 | 2 | 11 |

(b)

Memory address     0 1 2 3 4 5 6 7 8 9 10 11

Memory data cells for the 1-th TI block: | a1 | j1 | g1 | d1 | e1 | b1 | k1 | h1 | i1 | f1 | c1 | l1 |

(c)

Address generation for deinterleaving the 1-th TI block: | 0 | 5 | 10 | 3 | 4 | 9 | 2 | 7 | 8 | 1 | 6 | 11 |

(d)

【FIG. 11】
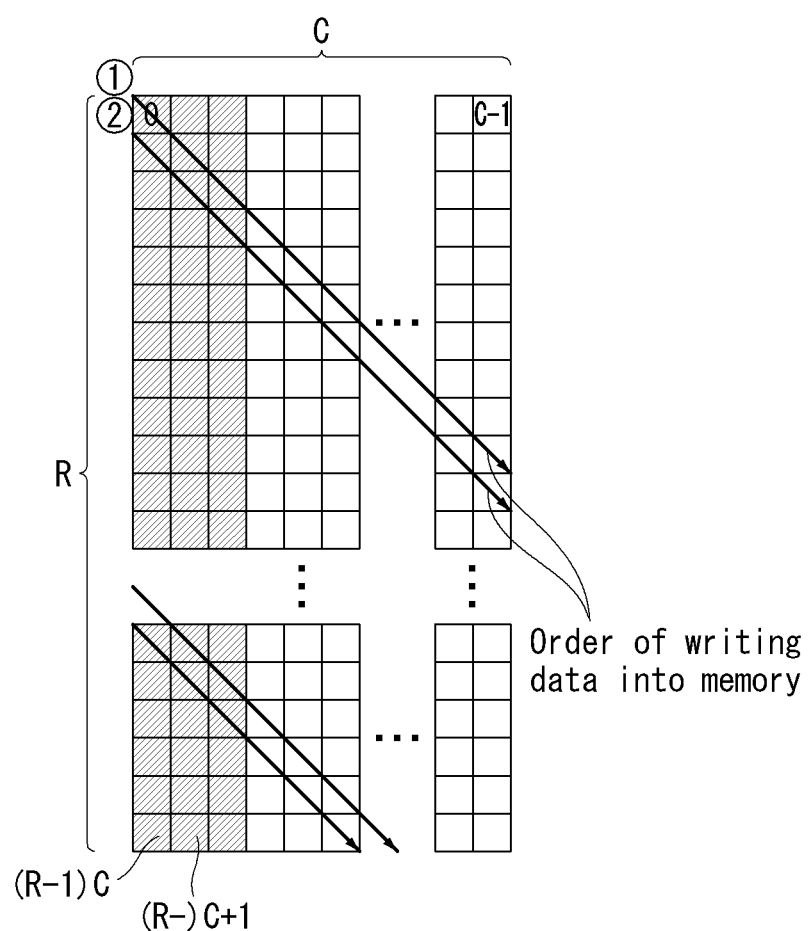

[FIG. 12]
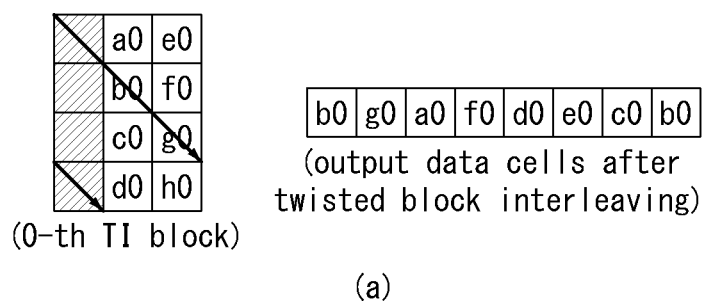
(a)
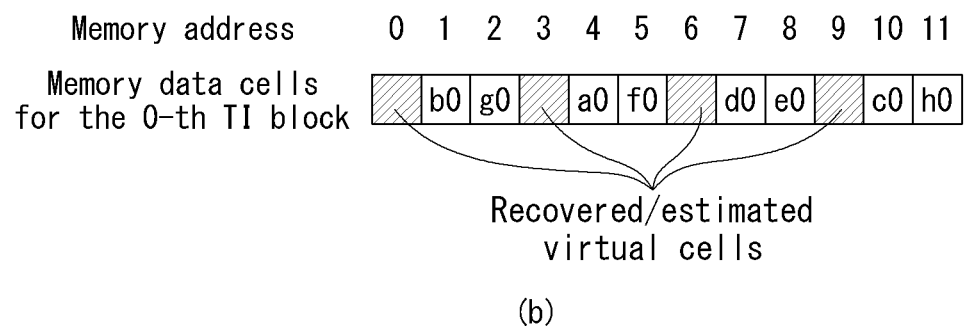
(b)

[FIG. 13]
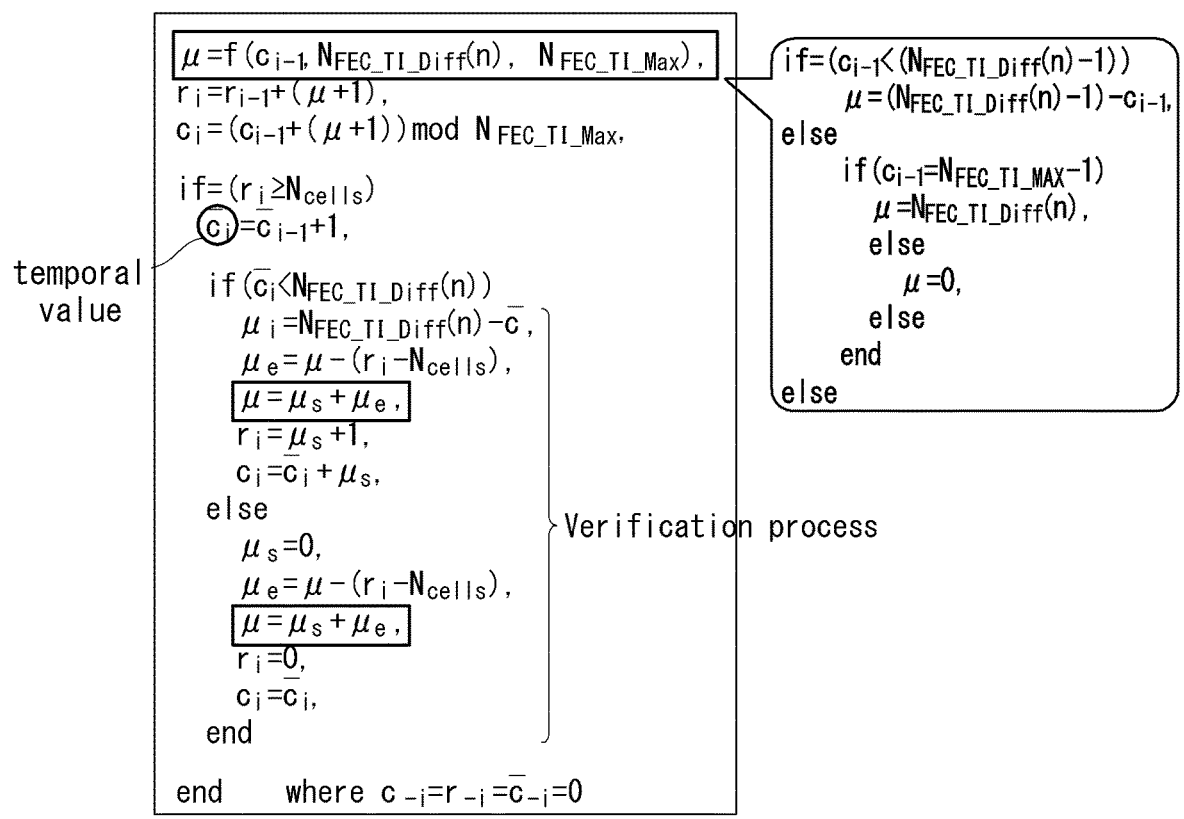

[FIG. 14]
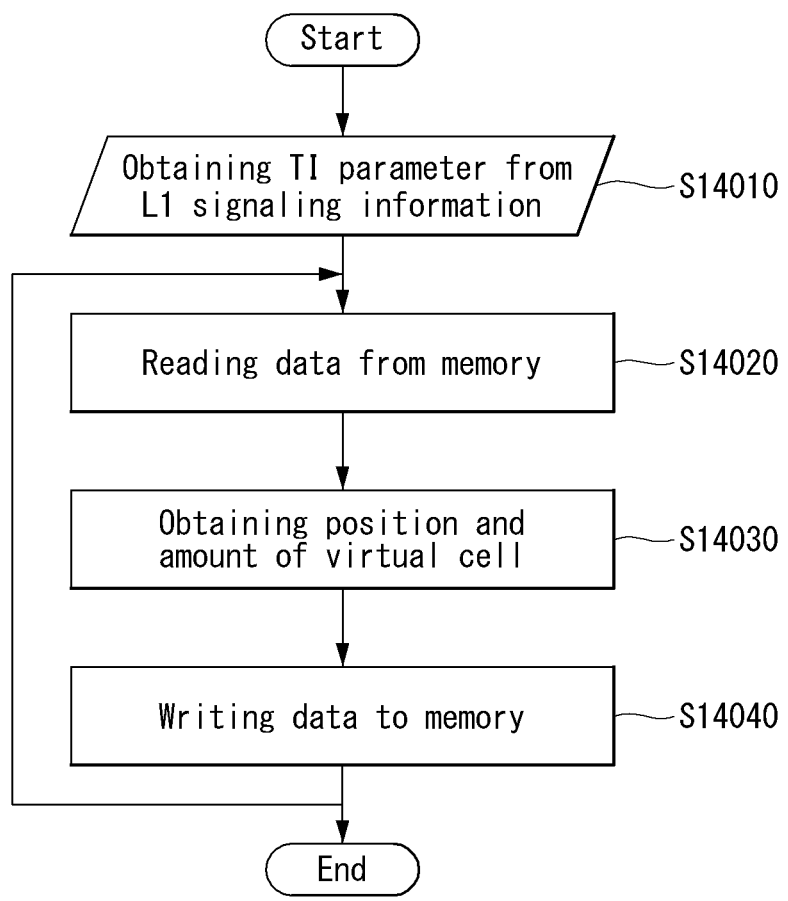

[FIG. 15]
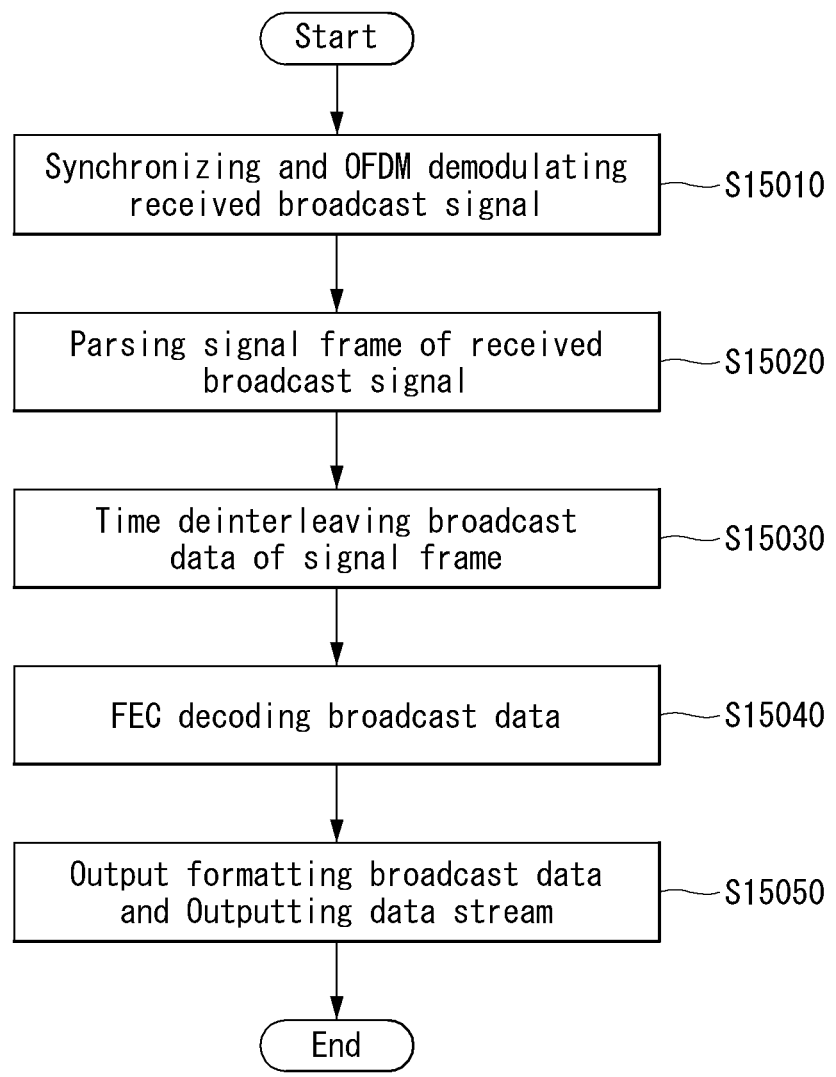

DEVICE AND METHOD FOR RECEIVING BROADCAST SIGNAL

CROSS-REFERENCE TO RELATED APPLICATIONS

This application is a Continuation of U.S. patent application Ser. No. 16/301,913, filed on Nov. 15, 2018 (now U.S. Pat. No. 10,666,390, issued on May 26, 2020), which was filed as the National Phase of PCT International Application No. PCT/KR2016/005467, filed on May 24, 2016, all of which are hereby expressly incorporated by reference into the present application.

BACKGROUND OF THE INVENTION

Field of the Invention

The present invention relates to a broadcast signal receiver and a method of receiving a broadcast signal.

Description of the Related Art

As transmissions of analog broadcast signals are terminated, various technologies for transmitting and receiving digital broadcast signals have been developed. A digital broadcast signal may include a greater amount of video/audio data than an analog broadcast signal, and further include various kinds of additional data as well as the video/audio data.

A digital broadcasting system can provide high definition (HD) images, multi-channel audio, and various additional services. However, for digital broadcasting, data transmission efficiency for a large amount of data transmission, robustness of transmission/reception networks, and network flexibility considering mobile reception devices should be improved.

SUMMARY OF THE INVENTION

To solve the technical problem, a method of receiving a broadcast signal according to an embodiment of the present invention includes synchronizing and orthogonal frequency division multiplexing (OFDM) demodulating a received broadcast signal; parsing a signal frame of the received broadcast signal; time deinterleaving broadcast data of the signal frame; forward error correction (FEC) decoding the broadcast data; and output formatting the broadcast data and outputting a data stream. The time deinterleaving broadcast data includes block deinterleaving data cells included in the broadcast data in a unit of a time interleaving (TI) block.

In a method of receiving a broadcast signal according to an embodiment of the present invention, the method of receiving a broadcast signal may further include obtaining time interleaving (TI) parameter information from L1 signaling information of the signal frame.

In a method of receiving a broadcast signal according to an embodiment of the present invention, when the block deinterleaving is performed by using a linear memory, the block deinterleaving may include writing the data cells of the TI block to a memory; generating an address sequence that deinterleaves the data cells of the TI block; and reading the data cells of the TI block from the memory based on the address sequence.

In a method of receiving a broadcast signal according to an embodiment of the present invention, when the TI block is read from the memory based on the address sequence, a subsequent TI block of the TI block may be written to the memory based on based on the read address sequence of the TI block.

In a method of receiving a broadcast signal according to an embodiment of the present invention, the block deinterleaving may further include determining whether the TI block includes virtual cells based on the TI parameter information; and obtaining a position and an amount of the virtual cells when the TI block includes the virtual cells. The data cells of the TI block may be written based on the position and amount of the virtual cells, and the virtual cells may be skipped in reading.

In a method of receiving a broadcast signal according to an embodiment of the present invention, when the block deinterleaving is performed by using a 2 dimensional (2D) memory, the block deinterleaving may further include writing the data cells of the TI block in a diagonal direction to the memory; and reading the data cells of the TI block in a column direction from the memory.

In a method of receiving a broadcast signal according to an embodiment of the present invention, the block deinterleaving may further include determining whether the TI block includes virtual cells based on the TI parameter information; and obtaining a position and an amount of the virtual cells when the TI block includes the virtual cells. The writing in the diagonal direction and the reading in the column direction may be performed based on the position and amount of the virtual cells.

To solve the technical problem, a broadcast signal receiver according to an embodiment of the present invention includes a synchronization and demodulation unit for synchronizing and orthogonal frequency division multiplexing (OFDM) demodulating a received broadcast signal; a parsing unit for parsing a signal frame of the received broadcast signal; a time deinterleaver for time deinterleaving broadcast data of the signal frame; a demapping and decoding unit for forward error correction (FEC) decoding the broadcast data; and an output processor for output formatting the broadcast data and outputting a data stream. The time deinterleaver includes a block deinterleaver for block deinterleaving data cells included in the broadcast data in a unit of a time interleaving (TI) block.

A broadcast signal receiver according to an embodiment of the present invention may obtain time interleaving (TI) parameter information from L1 signaling information of the frame parsed broadcast signal frame.

In a broadcast signal receiver according to an embodiment of the present invention, when the block deinterleaving is performed by using a linear memory, the block deinterleaver may write the data cells of the TI block to a memory, generate an address sequence that deinterleaves the data cells of the TI block, and read the data cells of the TI block from the memory based on the address sequence.

In a broadcast signal receiver according to an embodiment of the present invention, when the TI block is read from the memory based on the address sequence, a subsequent TI block of the TI block may be written to the memory based on based on the read address sequence of the TI block.

In a broadcast signal receiver according to an embodiment of the present invention, the block deinterleaver may determine whether the TI block includes virtual cells based on the TI parameter information, and obtain a position and an amount of the virtual cells when the TI block includes the virtual cells. The data cells of the TI block may be written based on the position and amount of the virtual cells, and the virtual cells may be skipped in reading.

In a broadcast signal receiver according to an embodiment of the present invention, when the block deinterleaving is performed by using a 2 dimensional (2D) memory, the block deinterleaver may write the data cells of the TI block in a diagonal direction to the memory, and read the data cells of the TI block in a column direction from the memory.

In a broadcast signal receiver according to an embodiment of the present invention, the block deinterleaver may determine whether the TI block includes virtual cells based on the TI parameter information, and obtain a position and an amount of the virtual cells when the TI block includes the virtual cells. The writing in the diagonal direction and the reading in the column direction may be performed based on the position and amount of the virtual cells.

According to the present invention, it is possible to efficiently receive and process a broadcast signal.

In particular, the present invention can block deinterleave data based on received signaling information, and can perform block deinterleaving using a 2D memory or a linear memory. Therefore, the memory can be flexibly implemented and used.

When using the 2D memory, by writing the data in the diagonal direction and reading it in the column direction, the receiver can spread the burst error generated in the data.

When using the linear memory, by generating and using an address sequence corresponding to an operation of writing the data in the diagonal direction and reading it in the column direction, the same effect as in the 2D memory can be achieved while using the linear memory.

Also, when using the linear memory, by using the same address sequence at the time of reading a data cell and at the time of writing a data cell of the next TI block, memory usage efficiency can be increased. In particular, in this case, it is possible to implement the operation with a single memory without using a separate memory for writing and reading.

The transmission/reception system of the present invention can use a virtual FEC block for responding to variable bit rates (VBR). By using the virtual FEC block, a signal frame can be configured more flexibly. However, since the transmitter uses the virtual FEC block, the receiver must perform time deinterleaving based on the virtual FEC block. That is, since the time deinterleaving according to the present invention determines whether or not virtual data cells are included and performs time deinterleaving depending on a position and an amount of the virtual data cells, it is possible to implement a broadcasting system capable of efficiently responding to the VBR.

BRIEF DESCRIPTION OF THE DRAWINGS

FIG. 1 illustrates system architecture of a broadcast signal transmitter according to an embodiment of the present invention.

FIG. 2 illustrates a framing and interleaving unit according to an embodiment of the present invention.

FIG. 3 illustrates a time interleaver according to an embodiment of the present invention.

FIG. 4 illustrates a twisted block interleaver and its operation according to an embodiment of the present invention.

FIG. 5 illustrates system architecture of a broadcast signal receiver according to an embodiment of the present invention.

FIG. 6 illustrates a frame parsing and deinterleaving unit according to an embodiment of the present invention.

FIG. 7 is a block diagram of a time deinterleaver according to an embodiment of the present invention.

FIG. 8 illustrates a twisted block deinterleaver and its operation according to an embodiment of the present invention.

FIG. 9 shows an example of a time interleaving operation according to an embodiment of the present invention.

FIG. 10 shows an example of a time deinterleaving operation according to an embodiment of the present invention.

FIG. 11 illustrates a deinterleaver memory and its deinterleaving operation according to an embodiment of the present invention.

FIG. 12 illustrates an interleaving and deinterleaving operation of a TI block including virtual cells according to an embodiment of the present invention.

FIG. 13 illustrates an embodiment for estimating a position and an amount of virtual cells according to an embodiment of the present invention.

FIG. 14 illustrates a time deinterleaving method considering a virtual cell according to an embodiment of the present invention.

FIG. 15 illustrates a method of receiving a broadcast signal according to an embodiment of the present invention.

DETAILED DESCRIPTION OF THE EMBODIMENTS

Preferred embodiments of the present invention will now be described in detail, examples of which are illustrated in the accompanying drawings. The following detailed description with reference to the accompanying drawings is intended to explain preferred embodiments of the present invention, rather than to show the only embodiments that can be implemented according to the present invention. The following detailed description includes details in order to provide a thorough understanding of the present invention. However, it will be apparent to those skilled in the art that the present invention may be implemented without these details.

Although most terms used in the present invention are selected from those generally used in the field, s some terms are arbitrarily selected by the applicant and their meaning will be described in detail in the following description as necessary. Accordingly, the present invention should be understood based on the intended meaning of the term rather than the mere name or meaning of the term.

The present invention relates to a broadcast signal receiver and a method of receiving a broadcast signal. In order to explain the broadcast signal receiver and the receiving method, a broadcast signal transmitter and a transmitting method will be briefly described first.

FIG. 1 illustrates system architecture of a broadcast signal transmitter according to an embodiment of the present invention.

The broadcast signal transmitter includes an input formatting unit 1010, a bit interleaved and coded modulation (BICM) unit 1020, a framing and interleaving unit 1030, and a waveform generation unit 1040. A unit may be referred to herein as a module, a block, and such a unit may be implemented as hardware or as software operating in a specific hardware.

The input formatting unit 1010 input formats input data. The input formatting unit 1010 may perform header compression on data and encapsulate it into link layer packets. The input formatting unit 1010 may baseband format the data and output a baseband packet for each physical layer pipe (PLP). The input formatting unit 1010 outputs data of PLP units.

The BICM unit 1020 may forward error correction (FEC) process and constellation map the data. The BICM unit 1020 may FEC encode, bit interleave, and constellation map PLP data. The FEC encoding of the BICM may be performed by using at least one encoding method of BCH encoding and LDPC encoding.

The framing and interleaving unit 1030 may time interleave the data, generate a signal frame containing the data, and frequency interleave the data. An operation of the framing and interleaving unit 1030 will be described later with reference to FIG. 2.

The waveform generation unit 1040 may generate an output waveform. The waveform generation unit 1040 may process the signal frame to generate a transmission signal. The waveform generation unit 1040 may generate the transmission signal by inserting a pilot, performing inverse fast fourier transform (IFFT), inserting a guard interval, and then adding a bootstrap signal.

FIG. 2 illustrates a framing and interleaving unit according to an embodiment of the present invention.

The framing and interleaving unit of FIG. 2 represents the framing and interleaving unit 1030 of FIG. 1.

The framing and interleaving unit 1030 may include a time interleaver 2010, a framing unit 2020, and a frequency interleaver 2030.

The time interleaver 2010 time interleaves broadcast data. The time interleaving will be described in more detail below. In FIG. 2, a plurality of time interleavers 2010 are shown for each PLP, but one time interleaver may interleave the data for each PLP in parallel.

The framing unit 2020 may generate/construct a signal frame. The signal frame may include a bootstrap, a preamble, and a data portion. However, the bootstrap may be added in the waveform generation unit. The bootstrap and preamble carry layer 1 (L1) signaling information. The data portion may include at least one subframe. The preamble may carry L1 basic information and L1 detail information. The L1 basic information may include parameter information that is needed to decode most fundamental signaling information of the system and the L1 detail information. The L1 basic information may have a fixed length. The L1 detail information may include data context and information that is needed to decode the data context. A length of the L1 detail information may vary from frame to frame.

The frequency interleaver 2030 may interleave the data in a frequency domain. The frequency interleaver 2030 may interleave data cells of OFDM symbol in the frequency domain. Frequency interleaving may be used optionally for the data in the subframe, but may always be used for a preamble symbol.

FIG. 3 illustrates a time interleaver according to an embodiment of the present invention.

FIG. 3 illustrates the time interleaver shown in FIG. 2 in more detail. The time interleaver may operate in two modes.

As shown in FIG. 3(a), the time interleaver may operate in a convolutional time interleaver (CTI) mode. Alternatively, as shown in FIG. 3(b), the time interleaver may operate in a hybrid time interleaving (HTI) mode. An operation mode of the time interleaver for the PLP may be signaled as TI mode information through the L1 detail information.

When the time interleaver operates in the CTI mode, the time interleaver includes a convolutional interleaver 3010, and the convolutional interleaver 3010 interleaves a sequence of cells of an input PLP.

When the time interleaver operates in the HTI mode, the time interleaver may include a cell interleaver 3020, a twisted block interleaver (TBI) 3030, and a convolutional delay line (CDL) 3040.

The cell interleaver 3020 arranges input cells of FEC blocks into TI blocks. The TI block may include at least one FEC block. The cell interleaver 3020 interleaves the cells in each FEC block.

The TBI 3030 may perform intra-subframe interleaving by interleaving the TI blocks. The TI block may include at least one cell-interleaved FEC block. Hereinafter, the twisted block interleaver may be referred to as a block interleaver.

The convolutional delay line 3040 may optionally perform inter-subframe interleaving. The CDL 3040 may spread block-interleaved TI blocks into a plurality of subframes.

FIG. 4 illustrates a twisted block interleaver and its operation according to an embodiment of the present invention.

FIG. 4 shows the twisted block interleaver 3030 of FIG. 3 and its operation.

In the interleaving of each TI block, the TBI may store cells of $N_{FEC\_TI}$ (n, s) FEC blocks $d_{n,s,0,0}$, $d_{n,s,0,0}$, $d_{n,s,0,1}$, . . . , $d_{n,s,0,N\_(cells-1)}$, $d_{n,s,1,0}$, $d_{n,s,1,1}$, . . . , $d_{n,s,N\_(FEC\_TI)(n,s)-1,0}$, $d_{n,s,N\_(FEC\_TI)(n,s)-1,1}$, . . . , $d_{n,s,N\_(FEC\_TI)(n,s)-1,N\_(cells-1)}$ from an output of the cell interleaver to a memory. Here, d_(n, s, r, q) represents an output cell of the cell interleaver belonging to the TI block s in an interleaving frame n. In the twisted block interleaver, the number of rows N_r is the number of the cells of the FEC block and the number of columns N_c is a maximum number $N_{FEC\_TI\_MAX}$ of the FEC blocks of the TI block. In addition, in the interleaving operation, a virtual FEC block is defined, and the number of the virtual FEC blocks in the TI block can be expressed by Equation 1.

$$N_{FEC\_TI\_Diff}(n,s) = N_{FEC\_TI\_MAX} - N_{FEC\_TI}(n,s) \quad \text{[Equation 1]}$$

That is, the number of the virtual FEC blocks in the TI block can be obtained by subtracting the number of the FEC blocks in the TI block (s) in the interleaving frame (n) of the corresponding TI block from the maximum number of the FEC blocks of the TI block. The virtual FEC blocks included in the TI block must be located before data FEC blocks of the TI block for deinterleaving in a given memory. That is, the virtual FEC blocks are located in previous columns of columns of a TI memory. The virtual FEC blocks are usually skipped in a read operation. Thus, the virtual FEC blocks may have any value such as 0 or x. That a value of $N_{FEC\_TI\_Diff}$ (n, s) is not 0 may indicate that the number of the FEC blocks between the TI blocks varies depending on a cell rate.

As shown in FIG. 4(a), the FEC blocks are serially written to a TBI memory in a column direction, i.e., column-wise. In the embodiment of FIG. 4(a), the number of the virtual FEC blocks ($N_{FEC\_TI\_Diff}$(n, s)) is two. Then, the cells shall be read out diagonal-wise from the first row (rightwards along the row beginning with the left-most column) to the last row as shown in FIG. 4(b). During a readout process for the intra-subframe interleaving, virtual cells belonging to the virtual FEC blocks are skipped. In a block interleaving array, a readout in a diagonal direction can be performed by calculating data of coordinates ($R_i$, $C_i$) and positions of the virtual cells in accordance with the following Equation 2.

$$R_i = i \bmod N_r \quad \text{[Equation 2]}$$

$$T_i = R_i \bmod N_c$$

$$C_i = \left(T_i + \left\lfloor \frac{i}{N_r} \right\rfloor\right) \bmod N_c$$

In Equation 2, R_i and C_i denote a row index and a column index, respectively, and T_i denotes a twisting parameter. When the cells are sequentially read out from a linear memory, cell positions can be calculated as θ_i=N_r*C_i+R_i. When a condition (θi>N_{FEC_TI_Diff} (n,s)*N_r) is not satisfied, the virtual cells are skipped during the readout process.

Hereinafter, a receiver and a deinterleaving operation will be described.

FIG. 5 illustrates system architecture of a broadcast signal receiver according to an embodiment of the present invention.

In FIG. 5, the broadcast signal receiver may include a synchronization and demodulation unit 5010, a frame parsing and deinterleaving unit 5020, a demapping and decoding unit 5030, and an output processor 5040. A unit in the present specification may be referred to a module, and a block, and such a unit may be implemented as hardware or as software operating in a specific hardware.

The synchronization and demodulation unit 5010 may detect/receive a broadcast signal through a receiving antenna and perform synchronization. The synchronization and demodulation unit 5010 may perform an operation corresponding to an inverse process of the operation of the waveform generation unit 1040 on the transmitter. The synchronization and demodulation unit 5010 may OFDM demodulate an OFDM-modulated broadcast signal.

The frame parsing and deinterleaving unit 5020 may parse a signal frame included in the received broadcast signal and extract data corresponding to a service selected by a user. The frame parsing and deinterleaving unit 5020 may perform an operation corresponding to an inverse process of the operation of the framing and interleaving unit 1030. Configuration and operation of the frame parsing and deinterleaving unit 5020 will be described later.

The demapping and decoding unit 5030 may FEC decode received data and convert the data into bit-domain data, and may deinterleave the data as necessary. The demapping and decoding unit 5030 may perform an operation corresponding to an inverse process of the operation of the BICM unit 1020.

The output processor 5040 may output process the data. The output processor 5040 may perform an operation corresponding to an inverse process of the operation of the input formatting unit 1010. The output processor 5040 may change a format of data processed in a physical layer and output a data stream.

FIG. 6 illustrates a frame parsing and deinterleaving unit according to an embodiment of the present invention.

The frame parsing and deinterleaving unit may correspond to the frame parsing and deinterleaving unit 5020 of FIG. 5. The frame parsing and deinterleaving unit 5020 may include a frequency deinterleaver 6010, a frame parser 6020, and a time deinterleaver 6030.

The frequency deinterleaver 6010 may perform an operation corresponding to an inverse process of the operation of the frequency interleaver 2030. In other words, the frequency deinterleaver 6010 may perform frequency deinterleaving for cells included in a symbol.

The frame parser 6020 may extract data included in the signal frame based on signaling information. For example, PLP data including data for a specific service may be extracted from the signal frame and output to the demapping and decoding unit 5030.

The time deinterleaver 6030 may perform an operation corresponding to an inverse process of the operation of the time interleaver 2010. The time deinterleaver may time deinterleave the data.

The time deinterleaver may operate in a convolutional time deinterleaver (CTD) mode or a hybrid time deinterleaver (HTD) mode. The broadcast signal receiver may obtain TI mode information included in L1 signaling information. The TI mode information indicates whether a time interleaving mode for a corresponding PLP is a CTI mode or a HTI mode. Therefore, the broadcast signal receiver can obtain the TI mode information for the corresponding PLP by decoding L1 detail information, and operate the time deinterleaver in the CTD mode or the HTD mode depending on the TI mode information. The CTD mode may be referred to the CTI mode, and the HTD mode may be referred to the HTI mode, respectively.

In the CTD mode, the time deinterleaver may include a convolutional deinterleaver, and deinterleave a sequence of cells of an input PLP.

In the HTD mode, the time deinterleaver may include a cell deinterleaver, a twisted block deinterleaver, and a convolutional delay line. The cell deinterleaver may deinterleave cells in a FEC block. The convolutional delay line may optionally perform inter-subframe deinterleaving. The convolutional delay line may collect TI blocks distributed in a plurality of subframes.

Hereinafter, an operation of the twisted block deinterleaver will be described in detail. First, a constant bit-rate deinterleaving operation will be described first, and a variable bit-rate deinterleaving operation will be described. Hereinafter, the twisted block deinterleaver may be referred to a block deinterleaver.

Since the TI block is synchronized to a subframe boundary in a time direction, the receiver can start time deinterleaving after detecting the subframe. The receiver may first detect a preamble included in the signal frame and decode the L1 detail information. The receiver may obtain time interleaving depth information included in the L1 detail information. The receiver may then start deinterleaving with a de-interleaver memory.

Hereinafter, the operation of the twisted block deinterleaver using a single-memory will be described in detail. In the following description, the following two conditions can be assumed.

1) Virtual FEC blocks are not considered. However, an operation effect of the virtual FEC block will be described later. As described above, since the virtual FEC block at the transmitter is skipped in a readout operation, it can have an arbitrary value such as 0 or x.

2) In the HTI mode, the cell interleaver and the convolutional delay line may not be used as an optional interleaving scheme. The convolutional delay line (in the transmitter/receiver) may perform first-in first-out (FIFO) processing like a conventional convolutional interleaver/deinterleaver. Even when the cell interleaver and the convolutional delay line are used as the optional interleaving scheme, the description of the twisted block deinterleaver may be effectively applied.

FIG. 7 is a block diagram of a time deinterleaver according to an embodiment of the present invention.

For each TI block for the same PLP, an address generator for time deinterleaving may be the same. Two memories may be needed in the time deinterleaver. However, a more efficient method using only one memory corresponding to one TI block may be used, and such a memory-efficient deinterleaver is shown in FIG. 7.

After subframe synchronization, for each TI block, data cells may be read out one at a time in the deinterleaver memory based on an address sequence generated by the address generator. For each read output cell, since a memory position has been cleared by reading the output cell, a new input cell may be written to the same address in the memory. The address generator 7020 may generate an address that reads data from the data cells in a time deinterleaver memory. And when using the single memory, the address used to read the data may be used to write data of the next TI block. Thus, since one address is used to read the data of the previous TI block and to write data of the subsequent TI block, the read and write operations can be implemented in one memory.

FIG. 8 illustrates a twisted block deinterleaver and its operation according to an embodiment of the present invention.

As shown in FIG. 8, the twisted block interleaver writes input data in a column direction to a buffer memory (R rows×C columns), and reads out the data in a diagonal direction. The corresponding deinterleaver thus performs an inverse operation of interleaving. That is, the block deinterleaver writes the data in the diagonal direction and reads out the data in the column direction as shown in FIG. 8. In FIG. 8, the block deinterleaver may first write the data in the diagonal direction of (1), and write the data in the diagonal direction of (2). Therefore, a total memory size of the deinterleaver can be defined as M=R×C.

An actual block of memory used may be implemented as a contiguous memory block as in FIG. 8(c). In a case of the memory block as shown in FIG. 8(c), a correct address sequence has to be calculated. Addresses of elements of the memory can be calculated by index i, where i is greater than or equal to 0 and less than or equal to M−1 (0≤i≤M−1).

The address generator must compute an output sequence, which can be computed based on the definition of the address generator of the twisted block interleaver. Basically, it is preferable that the twisted block deinterleaving operates based on the following operation sequence.

1) After initial subframe synchronization, for a first TI block of data, the data is received and written to the memory in sequential order in the memory. Only for this TI block, the deinterleaver memory is only filled and no output data is produced. When the whole TI block is input, the data is ready to be output.

2) When a second TI block of the input data is received, the first TI block is read out. The (same) address sequence in which the first TI block is read out can be used to write a data symbol belonging to the second TI block. Therefore, efficient use of a time deinterleaving memory becomes possible.

3) If the second TI block is all stored in the memory (or if the first TI block is completely read out), the second TI block is also ready to be read out. Then, a second TI block data is read out based on a generated second address sequence, and a third TI block data is written based on the second address sequence.

4) Steps 2) and 3) are repeatedly performed on input TI blocks.

For the above-described write-and-read operation, the address generating of the address generator can be described using a 2D memory. Addresses for a sequential memory may be calculated by switching addresses of the 2D memory. An equation for an operation of the address generator can be defined as Equation 3 below.

$$r_{i,j} = i \bmod R$$ [Equation 3]

$$r_{i,j} = s_j \times r_{i,j} \; i \bmod C$$

$$c_{i,j} = \left(t_{i,j} + \left\lfloor \frac{i}{R} \right\rfloor\right) \bmod C$$

In Equation 3, the address for cells of the 2D memory may be defined by coordinates ($R_{i,j}$, $C_{i,j}$, i=0,1, ..., M−1). A row index and a column index of an i-th data of a j-th TI block may be defined as coordinates ($R_{i,j}$, $C_{i,j}$), and ti, j represents a twisting parameter. A parameter $s_j$ varying with a TI block number j may be defined as Equation 4 below.

$$s_j = \bmod(s_{j-1}-1, C) \text{ with } s_{-1}=0$$ [Equation 4]

In a sequential memory array, data or cells are sequentially read and written, and coordinate addresses ($R_{i,j}$, $C_{i,j}$) of the 2D memory may be converted into linear addresses by the following Equation 5. That is, the coordinate address for the i-th data of the j-th TI block may be converted into a linear address sequence by Equation 5.

$$a_{i,j} = R \times c_{i,j} + r_{i,j}.$$ [Equation 5]

FIG. 9 shows an example of a time interleaving operation according to an embodiment of the present invention.

The embodiment of FIG. 9 shows an embodiment of a twisted block interleaver having four rows and three columns.

In FIG. 9(a), data (a0, b0, ..., k0, l0) of a 0-th TI block are written in the column direction in a 4×3 memory and read in the diagonal direction. Twisted block interleaved output data cells are output in order of a0, f0, k0, d0, e0, j0, c0, h0, i0, b0, g0, and l0 as shown in FIG. 9(a).

In FIG. 9(b), data (a1, b1, ..., k1, l1) of a first TI block are written in the column direction in the 4×3 memory and read in the diagonal direction. Twisted block interleaved output data cells are output in order of a1, f1, k1, d1, e1, j1, c1, h1, i1, b1, g1 and l1 as shown in FIG. 9(b).

FIG. 10 shows an example of a time deinterleaving operation according to an embodiment of the present invention.

The embodiment of FIG. 10 shows an embodiment of a twisted time deinterleaver using a linear memory.

FIG. 10(a) shows input data cells for the 0-th TI block. The output data cells (a0, f0, k0, ..., b0, l0) for the 0-th TI block in FIG. 9(a) are input to the 0-th TDI block as shown in FIG. 10(a).

The address generator generates an address sequence for deinterleaving the data cells of the 0-th TI block. An address for deinterleaving 0-th TI block data is 0, 9, 6, 3, 4, 1, 10, 7, 8, 5, 2, 11 as shown in FIG. 10(b). Therefore, the time deinterleaver can perform deinterleaving by outputting the cells in order of the cell a0 of the 0-th memory, the cell b0 of the 9-th memory, and the cell c0 of the 6-th memory.

The time deinterleaver may write data cells of a first TI block to the memory in accordance with the address sequence for the 0-th TI block of FIG. 10(b). That is, a1 may be written in the place where the 0-th memory cell a0 is read, f1 may be written in the place where the 9-th memory cell b0 is read, and k1 may be written in the place where the 6-th memory cell c0 is read. The data cells of the first TI block are written as shown in FIG. 10(c).

The address generator generates an address sequence for deinterleaving the data cells of the first TI block. The address sequence for deinterleaving a first TI block data is 0, 5, 10, 3, 4, 9, 2, 7, 8, 6, 11 as shown in FIG. 10(d). Therefore, the time deinterleaver can perform deinterleaving by outputting cells in order of the cell a1 in the 0-th memory, the cell b1 in the 5-th memory, and the cell c1 in the 10-th memory.

In terms of the time interleaver, a variable bit rate means that the number of FEC blocks for every TI block may vary. However, a basic time interleaving scheme for a constant bit rate can also be used for the variable bit rate if the following two requests are satisfied.

1) A column size of a block interleaver is set to a maximum number of the FEC blocks for the TI blocks.

2) If a current number of the FEC blocks is smaller than the maximum number of the FEC blocks for the TI block, the virtual FEC blocks are added by the difference (for example, $N_{FEC\_TI\_Diff}(n, s) = N_{FEC\_TI\_MAX} - N_{FEC\_TI}(n, s)$). Thus, by using the virtual FEC block, the variable bit-rate case can be processed like the constant bit-rate case. The virtual FEC block is skipped during the diagonal read operation of the transmitter.

For efficient deinterleaving using the single memory in the receiver, the virtual FEC blocks must be located before data FEC blocks. If the virtual FEC block is located behind the TI block, a problem may occur in the receiving. That is, in the time deinterleaving operation using the linear memory in the receiver, reading/writing can be performed using the same address sequence, if the virtual FEC block is located behind the TI block, a collision that the next cell is written to an unread memory unit may occur.

The deinterleaving of the receiving is performed in consideration of the virtual FEC blocks. That is, the transmitter generates a deinterleaving address sequence in consideration of a skipped position and skipped virtual cells.

FIG. 11 illustrates a deinterleaver memory and its deinterleaving operation according to an embodiment of the present invention.

FIG. 11 illustrates an embodiment in which deinterleaving is performed using the 2D memory.

Basically, the time deinterleaver performs an inverse operation of an interleaver. Therefore, positions of skipped virtual FEC blocks (or virtual cells) must be considered/estimated to perform a correct deinterleaving process at the receiver. FIG. 11 illustrates a memory writing operation in a diagonal direction considering the positions of the virtual FEC blocks.

In the embodiment of FIG. 11, the number of the virtual FEC blocks is three. Therefore, when the block deinterleaver writes the received data to the memory, the block deinterleaver performs data writing in the diagonal direction considering the positions of the preceding three FEC blocks as the virtual FEC blocks. FIG. 11 is a conceptual diagram for performing block deinterleaving, in which the receiver cannot actually write virtual FEC cells of the virtual FEC block to the memory. The receiver may write data in accordance with an address sequence generated in consideration of the virtual FEC block, and read the written data in the column direction. The virtual FEC blocks/virtual cells are skipped in the read operation.

FIG. 12 illustrates an interleaving and deinterleaving operation of a TI block including virtual cells according to an embodiment of the present invention.

FIG. 12 illustrates an embodiment in which deinterleaving is performed using the linear memory.

In FIG. 12, a correct deinterleaving is possible only when a position of the virtual cell and an amount of sequential virtual cells are correctly considered or estimated. The position and amount of the virtual cell can be estimated using a skip pattern used in an interleaving process. Once a skip pattern of the virtual FEC blocks is obtained, an estimation for the virtual FEC blocks is an inverse processing of the obtained skip pattern.

FIG. 12(a) shows an interleaved data sequence of a 0-th TI block. A first column corresponds to the virtual FEC block for a TI block of a 3×4 block. Therefore, deinterleaved output data cells become b0, g0, a0, f0, d0, e0, c0, h0 as shown in FIG. 12(a).

FIG. 12(b) shows an operation of writing 0-th TI block data in the memory in the deinterleaver. The deinterleaver can write TI block data to the memory in consideration of the position and amount of the skipped virtual cells. The deinterleaver can perform the deinterleaving operation by generating an address sequence in consideration of the virtual cell and reading the data cells in accordance with the generated address sequence.

In FIG. 12(b), the virtual cells have 0-th, 3rd, 6-th, and 9-th addresses in the memory. Thus, the time deinterleaver may input data cells to addresses of remaining memory units and skip the virtual cells in the read operation.

In FIG. 12(b), the virtual cells may be written to the memory, but the virtual cells do not necessarily have to be written to the memory. That is, the data cells (b0, g0, a0, f0, d0, e0, c0, h0) are written to the memory, and the data cells may be read from the memory in accordance with the address sequence considering the virtual cell.

FIG. 13 illustrates an embodiment for estimating a position and an amount of virtual cells according to an embodiment of the present invention.

In FIG. 13, μ represents a desired estimation of skipped virtual cell position and amount. The embodiment of FIG. 13 shows one of methods for obtaining the skipped virtual cell position and amount based on the number of maximum FEC blocks (NFEC_TI_MAX) of the TI block, the number of the virtual blocks (NFEC_TI_Diff (n)), and column information Ci−1.

However, the receiver can obtain the number of the maximum FEC blocks and the number of the virtual blocks by referring to TI parameter of SI information included in the received signal, and obtain the position and amount of the virtual cells using at least one of the number of the maximum FEC blocks, the number of the virtual blocks, or the column information.

The TI parameter of the SI information includes information (L1D_plp_HTI_num_ti_blocks) indicating the number of TI blocks per interleaving frame, information (L1D_plp_HTI_num_fec_blocks_max) indicating the maximum number of FEC blocks per interleaving frame for a current PLP, and information (L1D_plp_HTI_num_fec_blocks) indicating the number of FEC blocks included in a current interleaving frame for the current PLP. The broadcast receiver can obtain whether the virtual cells are included in the TI block and the position and amount of the virtual cells using this TI parameter information.

FIG. 14 illustrates a time deinterleaving method considering a virtual cell according to an embodiment of the present invention.

The broadcast receiver may obtain a TI parameter from L1 signaling information (S14010). The broadcast receiver may then determine which TI block includes a virtual cell.

The broadcast receiver performs a read operation from a memory (S14020). The method by which the broadcast receiver reads data cell from the memory is as described above.

The broadcast receiver may obtain a position and an amount of the virtual cell (S14030). If it is determined that the TI block to which data is to be written includes the virtual cell, the broadcast receiver may obtain the position and amount of the virtual cell for the TI block.

The broadcast receiver may perform a write operation to the memory (S 14040). The broadcast receiver may write the data cell to the memory based on the position and amount of the virtual cell. And the written data cells may be deinterleaved through the read operation (Back to 14020).

FIG. 15 illustrates a method of receiving a broadcast signal according to an embodiment of the present invention.

The broadcast signal receiver may synchronize and OFDM demodulate a received broadcast signal (S15010).

The broadcast signal receiver may parse a signal frame of the received broadcast signal (S15020). The signal frame may include a bootstrap signal, a preamble, and a payload portion. The preamble may include L1 signaling information indicating a parameter for a physical layer signal frame. The L1 signaling information may include the TI parameter information described above.

The broadcast signal receiver may time deinterleave broadcast data of the signal frame (S15030). The broadcast signal receiver may perform time deinterleaving in accordance with an interleaving mode of PLP data. In particular, when the interleaving mode is the HTI mode, the broadcast signal receiver may perform block deinterleaving. The interleaving mode may also be determined through the L1 signaling information of the broadcast signal. That is, the time deinterleaving S15030 may further include block deinterleaving cells included in the broadcast data in a unit of a TI block.

The broadcast signal receiver may FEC decode the broadcast data (S15040), and output format the broadcast data and output a data stream (S15050).

The broadcast signal receiver may obtain the time interleaving (TI) parameter information from the L1 signaling information. As an embodiment, the TI parameter information may include TI mode information indicating the CTI mode or HTI mode, information (L1D_plp_HTI_num_ti_blocks) indicating the number of TI blocks per interleaving frame, information (L1D_plp_HTI_num_fec_blocks_max) indicating the maximum number of FEC blocks per interleaving frame for a current PLP, and information (L1D_plp_HTI_num_fec_blocks) indicating the number of FEC blocks included in a current interleaving frame for the current PLP.

The broadcast signal receiver may perform block deinterleaving using a 2D memory or a linear memory. The linear memory may also be referred to as a sequential memory.

When block interleaving is performed using the linear memory, the time deinterleaver writes data cells of the TI block to the memory and generates an address sequence for deinterleaving the data cells. The time interleaver may read the written data cells from the memory based on the address sequence.

As described above, the time deinterleaver may sequentially write data cells of a first TI block to the linear memory, and can read it using a first address sequence. The time deinterleaver may write data cells of a second TI block to the memory based on the first address sequence. That is, for the TI blocks after the first TI block, data cells of a subsequent TI block are written using the address sequence used for reading a preceding TI block. Therefore, it is possible to write and read together data in a single memory, thereby reducing a memory size required for deinterleaving. A memory size for implementation of the single memory can be reduced to nearly half of use of a double memory.

The broadcast receiver/time deinterleaver may determine whether the TI block includes virtual cells based on the TI parameter information. The broadcast receiver may determine the number of virtual FEC blocks by subtracting the FEC blocks included in the TI block from the maximum number of the FEC blocks. The number of the FEC blocks included in the TI block may be obtained by using the number of the TI blocks per interleaving frame and the maximum number of the FEC blocks per interleaving frame (or the number of FEC blocks per interleaving frame).

When the TI block includes the virtual cells, the broadcast receiver may obtain a position and an amount of the virtual cells and write the data cells to the memory based on the position and amount of the virtual cells. The virtual cells may be skipped in a reading process in accordance with the address sequence.

The block interleaving may also be performed using the 2D memory. In this case, the block deinterleaving further includes writing the data cells of the TI block in a diagonal direction to the memory and reading the data cells of the TI block in a column direction from the memory. The address sequence for the linear memory described above is generated based on the diagonal direction writing and column direction reading of the 2D memory and reflects this write and read operations of the 2D memory.

Even when the 2D memory is used, the receiver may determine whether to include the virtual cells, and perform writing and reading based on the position and amount of the obtained virtual cells when the TI block is included.

Each of the steps described in the above embodiments may be performed by hardware/processors. Each module/block/unit described in the above embodiments may operate as the hardware/processor. Further, the methods proposed by the present invention may be executed as codes. These codes may be written to a storage medium readable by the processor, and thus readable by a processor provided by an apparatus.

Although the present invention has been described with reference to individual drawings for the convenience of description, it is still possible to design so that embodiments described with reference to each drawing may be merged to implement a new embodiment. The apparatus and method according to the present invention are not limited to configurations and methods of the embodiments described above, but the entire or part of the embodiments may be combined selectively so that various modifications may be made to the embodiments.

Meanwhile, the method proposed by the present invention may be implemented as processor readable codes in a processor readable recording medium provided in a network device. The processor-readable recording medium includes all kinds of recording devices storing data which may be read by the processor. Examples of the processor-readable recording medium include a ROM, a RAM, a CD-ROM, a magnetic tape, a floppy disk, an optical data storage device, and the like and further include a device implemented as a type of a carrier wave such as transmission through the Internet. Also, the processor-readable recording medium may be distributed over computer systems connected to each other through a network so that processor-readable codes may be stored and executed in a distributed manner.

Further, although the embodiments of the present invention have been illustrated and described above, the present invention is not limited to the aforementioned specific embodiments, various modifications may be made by those skilled in the art to which the present invention belongs without departing from the subject matters of the present invention that are claimed in the claims, and these modifications should not be understood individually from the technical spirit or prospect of the present invention.

It will be understood by those skilled in the art that various modifications and variations can be made therein without departing from the spirit or scope of the invention. Accordingly, it is intended that the present invention includes the modifications and variations thereof provided within the scope of the appended claims and their equivalents.

In the present specification, all apparatus and method inventions are herein mentioned and descriptions of both apparatus and method inventions can be supplemented and applied to each other.

Various embodiments are described in the best mode to embody the present invention.

The present invention is used in a series of broadcast signal providing fields.

It will be apparent to those skilled in the art that various modifications and variations of the present invention can be made without departing from the spirit or scope of the invention. Accordingly, it is intended that the present invention includes the modifications and variations of the present invention provided within the scope of the appended claims and their equivalents.

What is claimed is:

1. A method of receiving a broadcast signal, the method comprising:
   receiving the broadcast signal;
   orthogonal frequency division multiplexing (OFDM) demodulating the broadcast signal;
   parsing a signal frame of the broadcast signal;
   time deinterleaving one or more Time Interleaving (TI) blocks of the signal frame by writing the one or more TI blocks into a single linear memory based on memory addresses for actual data cells for the one or more TI blocks, wherein position information of virtual cells skipped in a time interleaving reading operation is recovered; and
   forward error correction (FEC) decoding the broadcast signal.

2. The method of claim 1, further comprising:
   obtaining time interleaving (TI) parameter information from L1 signaling information of the signal frame.

3. The method of claim 1,
   wherein when data cells of a TI block are read from the single linear memory based on an interleaving sequence order, data cells of a subsequent TI block are written to the single linear memory based on the interleaving sequence order.

4. The method of claim 1,
   wherein the position information of the virtual cells is recovered in a writing operation of the time deinterleaving.

5. A broadcast signal receiver comprising:
   a demodulator to orthogonal frequency division multiplexing (OFDM) demodulate a broadcast signal;
   a parser to parse a signal frame of the broadcast signal;
   a time deinterleaver to time deinterleave one or more Time Interleaving (TI) blocks of the signal frame by writing the one or more TI block into a single linear memory based on memory addresses for actual data cells for the one or more TI blocks, wherein position information of virtual cells skipped in a time interleaving reading operation is recovered; and
   a decoder to forward error correction (FEC) decode the broadcast signal.

6. The broadcast signal receiver of claim 5,
   wherein the broadcast signal receiver obtains time interleaving (TI) parameter information from L1 signaling information of the signal frame.

7. The broadcast signal receiver of claim 5,
   wherein when data cells of a TI block are read from the single linear memory based on an interleaving sequence order, data cells of a subsequent TI block are written to the single linear memory based on the interleaving sequence order.

8. The broadcast signal receiver of claim 5,
   wherein the position information of the virtual cells is recovered in a writing operation of the time deinterleaver.

* * * * *